United States Patent [19]

Bellhouse et al.

[11] 4,328,102
[45] May 4, 1982

[54] MEMBRANE APPARATUS HAVING ALTERNATE OPPOSITE FLOW TRANSVERSE TO MEANS FLOW

[76] Inventors: Brian J. Bellhouse, The Lodge, North St., Islip, Oxfordshire; William S. Haworth, Redding Wyck House, Market St., Charlbury, Oxford, both of England

[21] Appl. No.: 206,545

[22] PCT Filed: Nov. 21, 1979

[86] PCT No.: PCT/GB79/00200
§ 371 Date: Jun. 12, 1980
§ 102(e) Date: Jun. 12, 1980

[87] PCT Pub. No.: WO80/01043
PCT Pub. Date: May 29, 1980

[30] Foreign Application Priority Data

Nov. 22, 1978 [GB] United Kingdom ............... 45576/78

[51] Int. Cl.³ ............................................. B01D 31/00
[52] U.S. Cl. .................................. 210/321.4; 210/405; 210/414; 210/456; 422/48; 261/DIG. 28; 128/DIG. 3; 165/46; 165/84; 165/109 R
[58] Field of Search ........................... 55/158; 422/48; 210/247, 321, 405, 407, 413, 414, 456, 541; 165/46, 84, 109; 261/DIG. 28; 128/DIG. 3

[56] References Cited

U.S. PATENT DOCUMENTS

| T867,005 | 10/1969 | Ulmschneider et al. | 210/321.3 |
| 3,567,028 | 3/1971 | Nose | 422/48 X |
| 4,079,007 | 3/1978 | Hutchisson | 210/321.1 X |

FOREIGN PATENT DOCUMENTS 1378701 12/1974 United Kingdom ............. 210/321.1

Primary Examiner—Thomas G. Wyse
Assistant Examiner—David R. Sadowski
Attorney, Agent, or Firm—Murray and Whisenhunt

[57] ABSTRACT

A dialyser has a membrane assembly (12) comprising two superposed conduits partially defined, and separated, by a transfer membrane wall. The walls of the conduit are provided with furrowing (38 or 39) extending with a component along the conduits. Blood is pumped through one conduit by a roller pump (21) and dialysate is pumped in counter current through the other conduit by a roller pump (24). The conduits communicate with separate chambers in flexible bladders (16) along each side edge of the conduits and the bladders are alternately compressed by rollers (27) to provide a superimposed reciprocatory flow component on the blood and dialysate in a direction transverse to the length of the conduits. This reciprocatory flow component, in conjunction with the furrows, produces vortexes in, and good mixing of, the blood and dialysate in their respective conduits and hence enhanced contact of each of these liquids with the transfer membrane wall.

13 Claims, 4 Drawing Figures

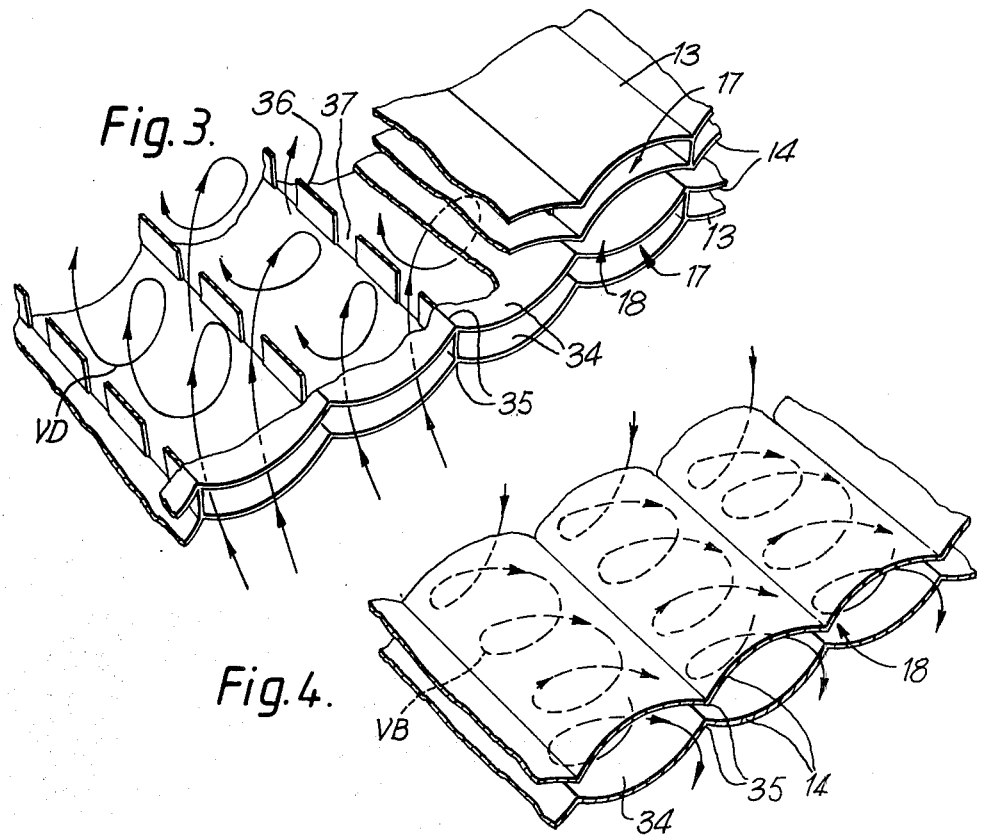

MEMBRANE APPARATUS HAVING ALTERNATE OPPOSITE FLOW TRANSVERSE TO MEANS FLOW

The invention is concerned with apparatus for effecting transfer of heat or mass between two fluids, of which at least one is usually a liquid, through a transfer membrane. Such apparatus is used for ultrafiltration/reverse osmosis applications and in the medical field, for example, in blood oxygenators, that is artificial lungs, and dialysers, such as artificial kidneys, in which case one fluid is blood, and the other is oxygen or dialysate. In practice the efficiency of the transfer across the membrane is limited by the extent to which the total volume of fluid can be brought into close proximity with the membrane. It is not sufficient to reduce the thickness of the fluid layers, by reducing the thickness of the conduits in which they flow, as this increases undesirably the pressure drop across the apparatus and leads to uneven perfusion and regions of stagnation, which, in the case of blood, provides a danger of thrombosis.

We believe that the proper solution lies in so shaping the fluid flow conduits that significant mixing of the fluid occurs within the conduits. It has previously been proposed in British Patent Specification No. 1,442,754 to provide an apparatus comprising a conduit for flow of one of the fluids at least partially defined by the membrane, a transverse dimension of the conduit varying, either inherently or in response to pressure of fluid therein, in a regularly repeating manner along the length of the conduit, to provide a multiplicty of hollows in the membrane, the apparatus also comprising means communicating with the conduit for passing fluid through the conduit in a pulsatile flow, the arrangement being such that pulsation of fluid past the hollows gives rise in the hollows to rotary fluid flow having components of motion parallel and perpendicular to the general direction of flow in the conduit of the fluid.

The conduit may be defined between two predominantly planar surfaces, so that it has an elongate cross section transverse to the general direction of mean flow through the conduit, at least one of the surfaces then being provided by the membrane in which the requisite hollows are provided by parallel furrows.

It has previously been proposed for these furrows, and the intervening ridges, to extend tranversely to the direction of mean fluid flow through the conduit and for the pulsatile flow through the conduit to be provided by reciprocatory pulsations superimposed on, and in the same direction as, the mean flow along the conduit.

We find that this pulsation in the direction of mean flow disturbs the concentration gradient in the fluid flowing along the conduit and this is sometimes undesirable, particularly for the transfer of masses at high effectiveness, for example the transfer of small molecular weight solutes in the dialysers. Furthermore, the vortex mixing produced by the rotary fluid flow in the hollows is most efficient when the flow is continually reversing in direction, because vortexes are ejected from the hollows during the flow reversal. However flow reversal requires high peak to peak, pressure differentials in alternate directions along the conduit, and these are difficult to achieve in a simple and economic manner particularly with appreciably high mean flow velocities. The problem is particularly significant in ultrafiltration/reverse osmosis devices, such as those used for concentrating dyes or proteins, for recovering electrolytic paint solvents, or in the desalination of sea water. The performance of all these devices are limited by concentration polarisation of the membrane surface.

In accordance with the present invention, apparatus for effecting transfer of heat or mass between two fluids through a transfer membrane comprises a first conduit for the flow of a first one of the fluids defined between two predominantly planar surfaces of which at least one is provided by the membrane which is formed with alternate furrows and ridges extending side-by-side in a direction with a component along the conduit; first pumping means for passing fluid with a mean flow along the conduit and second pumping means for superimposing on the mean flow a reciprocating flow component transversely to the direction of mean flow and across the hollows and ridges such that the resulting pulsation of fluid past the furrows give rise in the furrows to a rotary flow having components of motion parallel and perpendicular to the reciprocatory flow component and to the membrane.

With this arrangement the particle flow path will be generally zig-zag through the conduit and the concentration gradient along the conduit will remain substantially unchanged by the pulsations. Furthermore, the transverse reciprocatory flow component does not require flow reversal in the mean flow direction so that the apparatus will operate satisfactorily with comparatively small peak to peak pressure differentials in the transverse direction.

The first pumping means, which provides the mean flow along the conduit, may be a unidirectional pump such as a roller pump. The second pumping means, which provides the transverse reciprocatory flow component may comprise a flexible bladder along each side each of the conduit, the two bladders being activated in turn, for example by mechanically linked actuators, to apply pressure alternately to the opposite edges of the conduit. In order to avoid short circuiting of the fluid paths through the conduit, the bladders are preferably sub-divided in the longitudinal direction of the conduit so that each part of the bladder pumps back fluid into only an adjacent part of the conduit.

The furrows may extend substantially parallel to the longitudinal direction of the conduit, or alternatively they may extend obliquely, for example at substantially 45°, to the longitudinal direction of the conduit.

The second fluid with which transfer is to be effected through the membrane will pass with a mean flow in counter or cross current to the first fluid on the opposite side of the or each membrane wall of the first conduit. Thus there may be a second conduit for the second fluid also defined between two predominantly planar surfaces of which one is provided by the membrane so that the two conduits are separated by a common wall formed by the membrane; at least one of the predominantly planar surfaces defining the second conduit being formed with alternate furrows and ridges; and third pumping means being provided for passing the second fluid through the second conduit in a flow having a pulsatile component transverse to the furrows in the second conduit, the arrangement being such that the puslation of the second fluid past the furrows in the second conduit gives rise in those furrows to a rotary fluid flow having components of motion parallel and perpendicular to the pulsatile flow component in the second conduit and to the membrane.

Many arrangements are possible. Thus the pulsatile flow of the second flow may involve a reciprocatory flow component superimposed in the same direction as or transverse to a mean flow of the second fluid which in turn may be in counter or cross current to the mean flow of the first liquid. Preferably, however, the furrows in the second conduit are parallel to those in the first conduit. The furrows in the second conduit may then be in the adjacent face of the common membrane wall, for example by making the membrane wall symmetrically undulating. Alternatively, and in some ways more simply, the predominantly planar surface defining the wall of the second conduit remote from the first conduit is provided with the alternate furrows and ridges. If the furrows run at substantially 45° to the mean flow of the two fluids, it is then immaterial whether the two mean flows are in counter or cross current as it will still be possible for the rotary flow in both conduits to be set up by superimposed transverse reciprocatory flow components. However, it is presently preferred for the pulsatile flow produced by the third pumping means to comprise a mean flow of the second fluid along the second conduit in counter current to the mean flow of the first fluid along the first conduit, and a superimposed reciprocatory flow component transversely to the direction of mean flow. In this case, in order to produce the transverse reciprocatory flow component in each of the first and second conduits, it is possible to use two of the common flexible bladders one along each side edge of the conduit, the common bladders being sub-divided into chambers communicating with respective ones of the conduits.

There may be two of the second conduits one on each face of the first conduit. Both walls of the first conduit, separating the first conduit from the two second conduits, will then be formed by transfer membranes. Also the two predominantly planar surfaces, between which at least one of the conduits is defined, may be separated along the ridges between the furrows by discontinuous webs, openings in which provide communication between adjacent furrows and allow the fluid to pass from one furrow to the next as jets. These jets assist in setting up eddies in the furrows into which they are discharged.

The reciprocatory pulsatile flow components of the two fluids in the two conduits may be in phase and in the same direction, thereby minimising undesirable reverse ultrafiltration effects.

An example of a dialyser, for use as an artificial kidney, and constructed in accordance with the present invention, is illustrated diagrammatically in the accompanying drawings, in which:

FIGS. 3 and 4 are diagrammatic perspective views of parts of a membrane envelope assembly forming a part of the dialyser.

Figure 1:
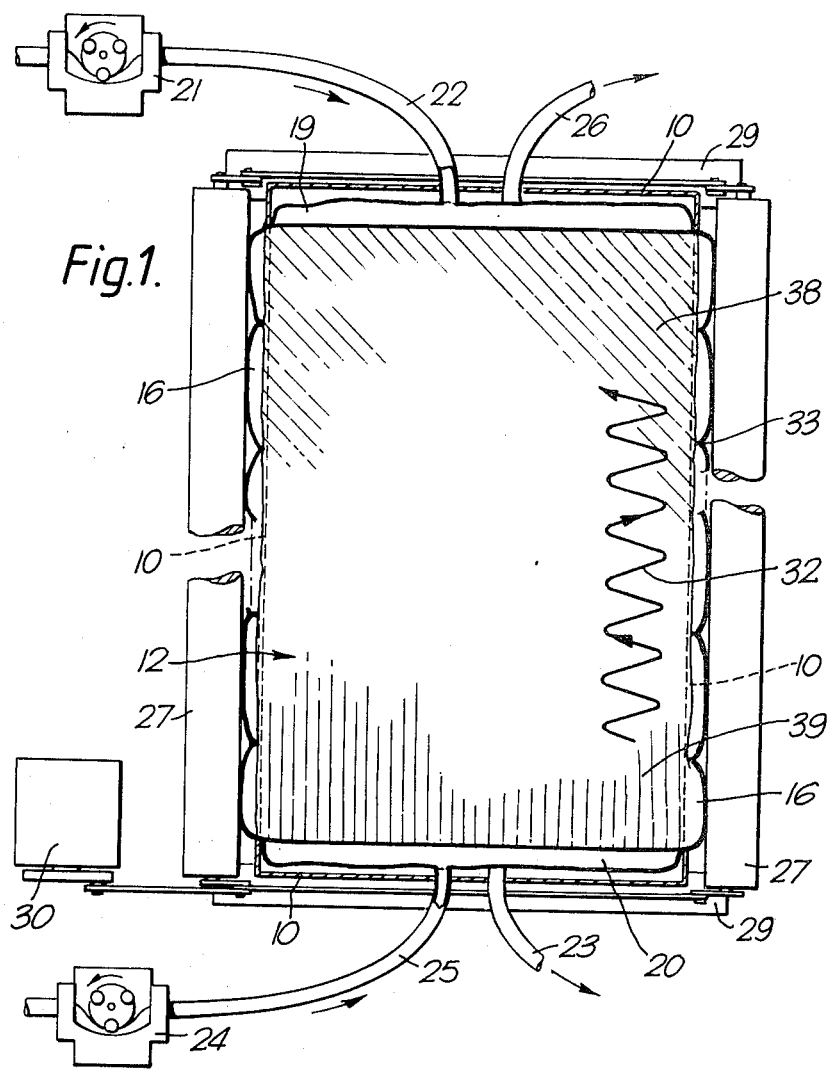
FIG. 1 is a plan.
Figure 2:
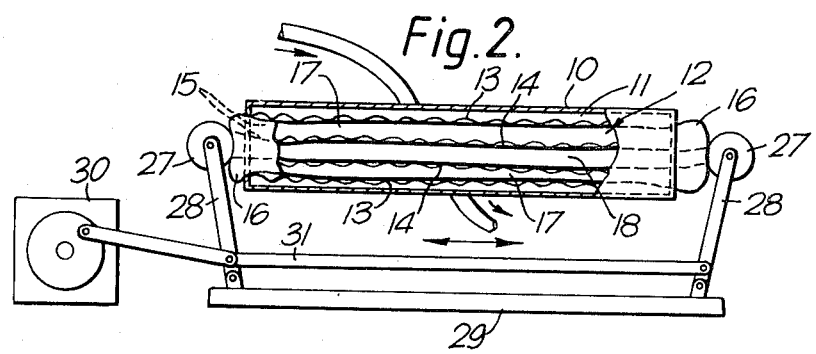
FIG. 2 is an end elevation.

The illustrated dialyser comprises a rectangular housing 10 providing an internal generally rectangular shallow chamber 11. Located within the chamber and supported by its close proximity to the walls of the chamber, is a membrane envelope assembly 12. As will become apparent from a subsequent description of FIGS. 3 and 4, the membrane envelope assembly includes four superimposed membrane layers of which the upper and lower membranes 13 are impermeable and the inner two membranes 14 semi-permeable. Adjacent membranes are sealed together along the ends of the assembly, and are sealed, along the side edges of the assembly to respective dividing walls 15 of a respective one of two flexible bladders 16 extending along the side edges of the housing 10. The membrane assembly thus provides three superposed conduits each defined between two predominantly planar surfaces so that each conduit has an elongate cross section transverse to its length. The upper and lower conduits 17, between adjacent membranes 13 and 14, are intended for dialysate and the central conduit 18, between the membranes 14, is intended for blood.

Each conduit is provided at one end with a manifold portion 19 and at the other end with a manifold portion 20, the manifold portions of the adjacent conduits being sealed from one another by the membranes. These manifolds are coupled with a system for circulation of blood and dialysate through the conduits. Thus blood is pumped into the manifold portion 19 at the end of the blood conduit 18 by a roller pump 21 through a blood inlet duct 22. After passing along the conduit 18 the blood is discharged from the manifold portion 20 of the blood conduit through a blood outlet duct 23.

In an analogous manner dialysate is caused to flow, in counter current to the blood, through the two dialysate conduits 17. This is achieved by a roller pump 24 which pumps dialysate through a branched dialysate inlet duct 25 into the two manifold portions 20 at the adjacent ends of the dialysate conduits 17. After passing along these conduits, the dialysate is discharged from the manifold portions 19 at the downstream ends of the conduits 17 into a common dialysate discharge duct 26. The ducts 22, 23, 25 and 26 may be made of a thermoplastics material and heat sealed to thermoplastic material from which the membranes are made. Alternatively more complex distribution arrangements may be provided, such as distributors within the manifold portions clamped between parts of the housing and in alignment with ports in the housing.

In addition to the mean counter current flow of the blood and dialysate through the conduits, both liquids are also subjected to a superimposed reciprocatory flow component to and fro across the respective conduit. This is achieved by subjecting the flexible bladders alternately to pressure by means of rollers 27 which are mounted on arms 28 pivoted on a common base 29 and rocked to and fro in synchronism by means of a crank drive 30 and connecting rod 31. The blood and dialysate will thus repeatedly be forced from their respective conduits into the corresponding chambers between the separating walls 15 as one bladder 16 is allowed to expand, and subsequently expelled from that bladder as the corresponding roller 27 depresses the bladder. The actual flow path of any particle of the blood or dialysate through its conduit will be zig-zag as suggested for the dialysate by the arrow at line 32 in FIG. 1. It will be seen that each bladder 16 is divided by indentations 33 into separate longitudinal sections so that blood or dialysate received within a part of the bladder, will be expelled from substantially the same part of the bladder and no short circuit path would exist between the manifold portions 19 and 20 along the bladders.

The value of the reciprocatory flow component superimposed on the mean flow transversely to the lengths of the conduits will be apparent from FIGS. 3 and 4. Each of the membranes 13 and 14 is shaped to provide a series of parallel furrows 34 separated by ridges 35. Each furrow 34 is approximately 3 mm. wide and between 1 and 1.5 mm. deep. The separation of the adjacent pairs of membranes 13 and 14 and the minimum separation of the membranes 14 at the ridges 35 are each substantially 0.5 mm. The spaces corresponding to the furrows 34 in the conduits 17 are separated by discontinuous spacer webs 36 in which rectangular slots 37, each 0.5 mm. deep and 0.5 mm. wide, are spaced at 1 mm. intervals along the webs. Similar webs could be provided in the conduit 18.

The membranes 13 and 14 are provided with their furrowed shape by being assembled flat and appropriately sealed together and placed between furrowed plates. The conduits are pumped full of water which causes the plastics material from which the membranes are made to yield plastically beyond their elastic limit and adopt permanently the final shape.

As suggested in FIG. 1 at 38, the furrows may extend at substantially 45° to the longitudinal and transverse directions of the conduit, or, as suggested at 39 parallel to the length of the conduit. These angles are not necessary alternatives but merely exemplary. What is important is that the blood and dialysate flow along their respective conduits with a composite pulsatile flow, the flow velocity continually changes in a direction across the ridges and furrows As a result vortexes VB are formed in the furrows 34 in the blood conduit 18 and vortexes VD are formed in the furrows 34 in the dialysate conduits 17. In general these vortexes will have a helical component owing to the inclination of the furrows to the direction of instantaneous flow through the conduits. The vortexes are enhanced in the dialysate conduits 17 by the openings 37 through which jets of the dialysate pass and are deflected by the solid portions of the webs 36 at the next ridge 35. The vortexes promote good mixing of the blood in the blood conduit and of the dialysate in the dialysate conduits and hence improved contact between the respective liquids and the transfer membranes 14.

The repetitive reversal of the flow in the direction across the conduits, and across the furrows enables the benefits of the vortex production to be achieved substantially independently of the mean flow velocity along the conduits.

In order for the transverse pulsation across the furrows to provide the desired vortex formation we recommend that a non-dimensional peak Reynold's number relating to the fluid flow exceeds five and in practice may be as high as fifty. The peak Reynold's number is defind as $$Ûh/v$$

where Û is the peak velocity across the furrows; h is half the minimum gap between the opposing membranes; and v is the kinematic velocity, i.e. the ordinary velocity divided by the density of the fluid.

Further details of the principle of using pulsatile flow across the hollows to produce vortexes are desribed in British Patent Specification No. 1,442,754.

Although the invention has been specifically described with relation to an artificial kidney, in which the transfer membranes 14 are capable of passing selected molecules, the invention is equally applicable to heat transfer systems. In the latter case the transfer membranes will usually be made of a suitable metal.

We claim:

1. Apparatus for effecting transfer of heat or mass between two fluids through a transfer membrane, comprising a first conduit having generally opposite edges for the flow of a first one of the fluids and defined between two predomiantly planar surfaces of which at least one is provided by the membrane, said membrane having alternate furrows and ridges extending side-by-side in a direction with a component along the first conduit, said first conduit having a longitudinal direction extending generall in the direction of said flow; first pumping means for passing the first fluid with a mean flow along the first conduit, and second pumping means for applying fluid pressure alternately to generally opposite edges of said first conduit to superimpose on the mean flow a reciprocatory flow component transverse to the direction of mean flow and transverse to the length of the furrows and ridges to cause a resulting pulsation of fluid to translate the fluid first in one direction and then in an opposed direction past the furrows to produce in the furrows a rotary flow having components of motion parallel and perpendicular to the reciprocatory flow component and to the membrane.

2. Apparatus according to claim 1, in which the conduit has opposite side edges and the second pumping means comprises a flexible bladder (16) along each side edge of the conduit, and means (27, 30) for activating the two bladders in turn to apply pressure alternately to said opposite side edges of the conduit.

3. Apparatus according to claim 2, in which each bladder is subdivided (33) in the longitudinal direction of the conduit so that each part of the bladder (16) pumps fluid back into only an adjacent part of the conduit.

4. Apparatus according to claim 1, in which the first pumping means comprises a roller pump (21).

5. Apparatus according to claim 1, in which the furrows (39) extend substantially parallel to the longitudinal direction of the conduit.

6. Apparatus according to claim 1, in which the furrows (38) extned obliquely to the longitudinal direction of the conduit.

7. Apparatus according to claim 6, in which the furrows (38) extend at substantially 45° to the longitudinal direction of the conduit.

8. Apparatus according to claim 1, in which a second conduit (17) for the second fluid is also defined between two predominantly planar surfaces (13, 14) of which one is provided by the membrane so that the two conduits (17, 18) are separated by a common wall (14) formed by the membranes; at least one of the predominantly planar surfaces defining the second conduit is formed with alternate furrows (34) and ridges (35); and third pumping (24,16) means are provided for passing a second fluid through the second conduit in a flow having a pulsatile component transverse to the furrows in the second conduit, the arrangement being such that pulsation of the second fluid past the furrows in the second conduit gives rise in those furrows to a rotary fluid flow (VD) having components of motion parallel and perpendicular to the pulsatile flow component in the second conduit and to the membrane.

9. Apparatus according to claim 8, in which the furrows (34) in the second conduit are parallel to those in the first conduit; and the pulsatile flow produced by the third pumping means comprises a mean flow of the second fluid along the second conduit in counter current to the mean flow of the first fluid along the first conduit, and a superimposed reciprocatory flow component transverse to the direction of mean flow.

10. Apparatus according to claim 9, in which, in order to produce the transverse reciprocatory flow component in each of the first and second conduits, the second and third pumping means comprise common flexible bladders (16) one along each side edge of the conduits, the common bladders being subdivided (15) into chambers communicating with respective ones of the conduits (17, 18); and means (27,31) are provided for activating the two bladders in turn to apply pressure alternately to said opposite side edges of the conduits.

11. Apparatus according to claim 10, in which each bladder is subdivided (33) in the longitudinal direction of the conduits so that each part of the bladder pumps fluid back into only an adjacent part of the respective conduit.

12. Apparatus according to claim 8, in which there are two of the second conduits (17) one on each face of the first conduit (18).

13. Apparatus according to claim 1 or claim 8, in which the two predominantly planar surfaces, between which the conduit or at least one of the conduits is defined, are separated along the ridges between the furrows by discontinuous webs (36), openings (37) in which provide communication between adjacent furrows and allow the fluid to pass from one furrow to the next as jets.

* * * * *